US 9,342,411 B2

(12) United States Patent
Belluomini et al.

(10) Patent No.: US 9,342,411 B2
(45) Date of Patent: May 17, 2016

(54) REDUCING MEMORY OVERHEAD OF HIGHLY AVAILABLE, DISTRIBUTED, IN-MEMORY KEY-VALUE CACHES

(71) Applicant: International Business Machines Corporation, Armonk, NY (US)

(72) Inventors: Wendy A. Belluomini, San Jose, CA (US); Anna S. Povzner, San Jose, CA (US); Himabindu Pucha, San Jose, CA (US); Amar Phanishayee, Kirkland, WA (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 13/657,608

(22) Filed: Oct. 22, 2012

(65) Prior Publication Data

US 2014/0115251 A1    Apr. 24, 2014

(51) Int. Cl.
*G06F 12/16* (2006.01)
*G06F 11/16* (2006.01)
*G06F 12/08* (2016.01)
*G06F 17/30* (2006.01)
*G06F 11/20* (2006.01)

(52) U.S. Cl.
CPC ........ *G06F 11/1666* (2013.01); *G06F 12/0808* (2013.01); *G06F 12/0866* (2013.01); *G06F 17/30* (2013.01); *G06F 11/20* (2013.01); *G06F 2212/1016* (2013.01); *G06F 2212/224* (2013.01); *G06F 2212/286* (2013.01)

(58) Field of Classification Search
CPC ................................ G06F 11/00; G06F 12/00
USPC ................ 711/103, 105, 120, 130, 137, 141, 711/144–147, 162, 166, 170–173, 202
See application file for complete search history.

(56) References Cited

U.S. PATENT DOCUMENTS

| 6,609,136 | B2 | 8/2003 | Bamford et al. |
| 7,240,238 | B2* | 7/2007 | Yanai et al. .................. 714/6.32 |
| 7,499,954 | B2* | 3/2009 | Cherkauer et al. |
| 7,653,668 | B1* | 1/2010 | Shelat et al. .................. 707/610 |
| 7,676,635 | B2* | 3/2010 | Newport et al. .............. 711/137 |
| 7,882,307 | B1 | 2/2011 | Wentzlaff et al. |
| 8,615,678 | B1* | 12/2013 | Madnani et al. ............... 714/5.1 |
| 2004/0193656 | A1* | 9/2004 | Pizzo et al. ................... 707/201 |
| 2008/0082756 | A1 | 4/2008 | Shen |
| 2008/0209145 | A1* | 8/2008 | Ranganathan et al. ....... 711/162 |
| 2009/0210633 | A1 | 8/2009 | Kundinger et al. |
| 2011/0078385 | A1 | 3/2011 | Lev et al. |

OTHER PUBLICATIONS

Anonymous, Self-Synchronizing Distributed Cache for Reducing Redundant Data Transfer in Distributed Shared-Nothing Environments, IP.com, May 24, 2011.
IBM, A System of Reducing Down Time in a Cached In-Memory Database Environment Using Checkpointing Mechanism, Apr. 14, 2009.
IBM, Shared disk I/O cache, Jan. 29, 2004.

* cited by examiner

*Primary Examiner* — Ryan Bertram
*Assistant Examiner* — Tracy Chan
(74) *Attorney, Agent, or Firm* — Lieberman & Brandsdorfer, LLC

(57) ABSTRACT

Maintaining high availability of objects for both read and write transactions. Secondary copies of cached objects are created and maintained on disks of a secondary caching node and in remote data storage. In response to an update request, the secondary copies of cached objects are updated. Secondary cached objects are synchronously invalidated in response to the update request, and the update is asynchronously propagated to a secondary caching node.

17 Claims, 4 Drawing Sheets

_US 9,342,411 B2_

REDUCING MEMORY OVERHEAD OF HIGHLY AVAILABLE, DISTRIBUTED, IN-MEMORY KEY-VALUE CACHES

BACKGROUND

This invention relates to maintaining high performance availability of objects in distributed in-memory caches backed by a database. More specifically, replicas of objects are created and maintained on disks of two or more nodes to mitigate memory overhead while serving reads and writes at memory speeds.

To meet the needs of database-driven applications for high performance data access and analytics, applications often cache frequently read data in scale-out distributed in-memory key-value caches. Distributed in-memory caches speed up read transactions by reducing the number of reads a backing database must perform, while sending write data directly to the backing database for persistence.

As the majority of read transactions are served from caches at in-memory speeds, users expect read performance to remain high at all times, even in the presence of caching node failures. However, the performance between cache and backing database varies to a significant degree. A caching node failure can therefore impose a sudden unreasonably high load between the cache and backend database, degrading performance. A sudden change in performance during recovery time may be perceived by users as a failure. Accordingly, to meet performance expectations, applications require high performance availability and serve queries at in-memory speeds in the presence of failures.

BRIEF SUMMARY

This invention comprises a method, system, and computer program product for maintaining high availability of objects in distributed in-memory caches.

In one aspect, a method is provided for use in a system having distributed in-memory caches backed by a database. A replica of a primary copy of a cached object of a primary node is maintained on at least one disk of a secondary caching node. An in-memory invalidation map is maintained local to the secondary caching node. In response to receipt of an update request of an object, an in-memory copy of a primary replica is updated. The object associated with the update request is synchronously invalidated in memory of the secondary caching node, which includes updating the invalidation map local to the secondary caching node. In addition, the update is asynchronously propagated to a replica disk local to the secondary caching node. Accordingly, high performance availability is provided in distributed in-memory caches backed by a database that requires minimal memory space overhead.

In another aspect, a computer program product is provided for use with electronic communication data. More specifically, the computer program product is provided in a system having distributed in-memory caches backed by a database. The computer program product is provided including a computer-readable non-transitory storage medium having computer readable program code embodied thereon. When executed, the computer maintains a replica of a primary copy of a cached object on at least one disk of a secondary caching node. An in-memory invalidation map is maintained local to the secondary caching node. In response to receipt of an update request, the computer program product updates an in-memory copy of a primary replica. The computer program product synchronously invalidates an object of the update request in memory of the secondary caching node, which includes an update to the invalidation map local to the secondary caching node, and asynchronously propagates the update to a replica disk local to the secondary caching node.

In yet another aspect, a system is provided for reducing memory overhead in distributed in-memory caches. Two or more distributed in-memory caches are provided backed by a database. At least one disk of a secondary caching node is provided with a replica of a primary copy of a cached object. An in-memory invalidation map is maintained local to the secondary caching node, and a functional unit is provided in communication with the secondary caching node. The functional unit includes one or more tools to maintain high availability of data objects. The tools include, but are not limited to, a map manager and an update manager. The map manager maintains the invalidation map local to the secondary caching node. The update manager updates an in-memory copy of a primary replica in response to an update request. More specifically, the update manager communicates with the map manager and through the use of the invalidation map synchronously invalidates an object of the update request in memory of the secondary caching node, including an update of the invalidation map local to the secondary caching node. The update manager further asynchronously propagates the update to a replica disk local to the secondary caching node. Accordingly, the map and update managers manage replication of data objects, while maintaining high availability of the objects.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a topology manager, a hook manager, a storage topology manager, a resource utilization manager, an application manager, a director, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

Figure 1:
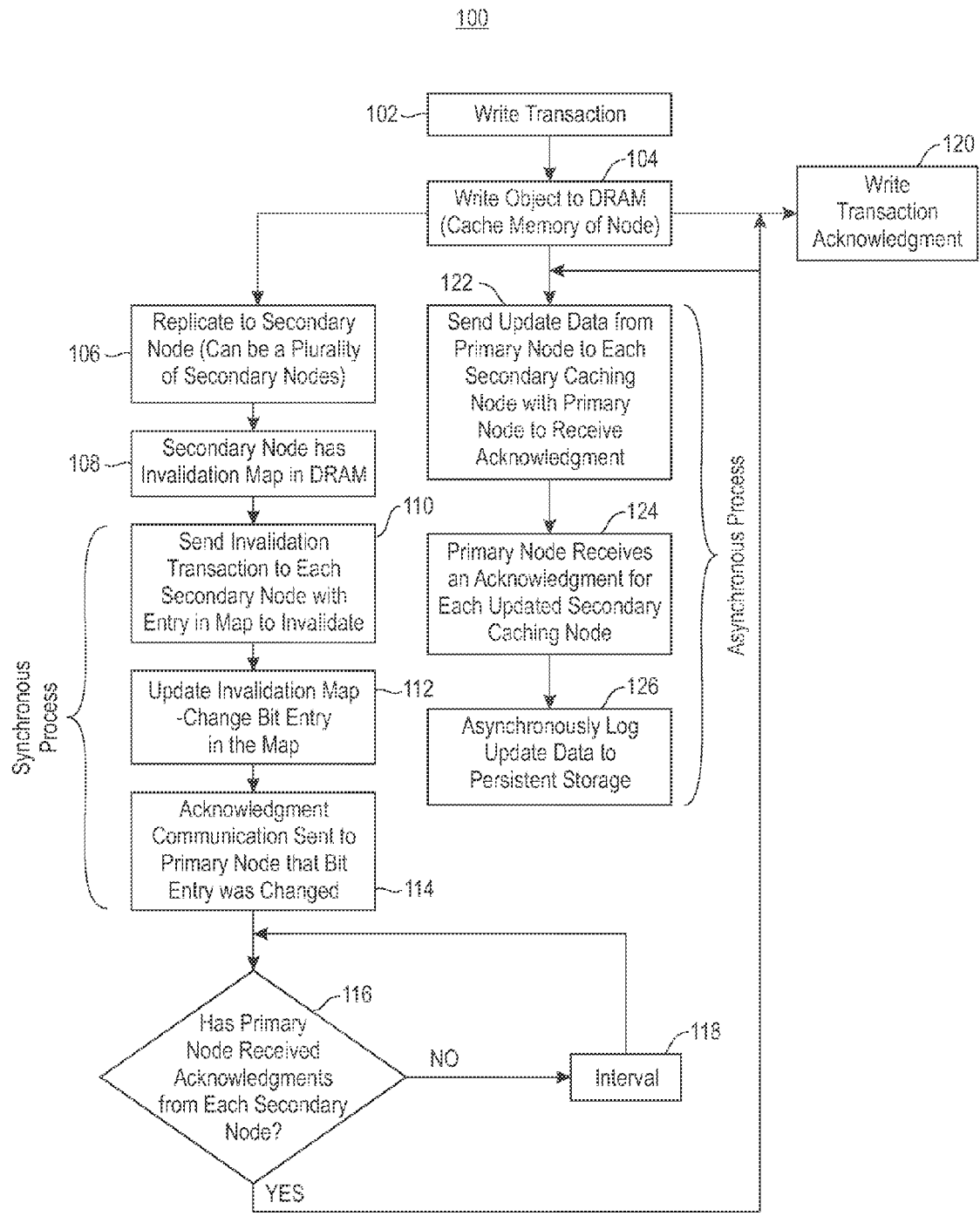
FIG. 1 depicts a flow chart illustrating a method for updating nodes in response to a write transaction.

FIG. 1 is a flow chart (100) illustrating a method for allocating data to an available data block. Objects are written to cache memory of a primary node (104) in response to a write transaction (102). In one embodiment, objects are written to dynamic random access memory (DRAM). To support high availability, the object is written to one or more replica nodes in communication with the primary node so that at least one replica of the object is maintained (106). The term replica node and secondary node are synonymous. Each secondary node in communication with the primary node has an invalidation map in DRAM (108). In one embodiment, the invalidation map is represented as a matrix in which each entry in the matrix is regarded as a bit. There are two processes employed to update object data, including a synchronous process and an asynchronous process.

The synchronous process for updating object data includes sending an invalidation transaction to each secondary node referencing the state of the object (110). More specifically, the invalidation map maintains only the state of the object. The invalidation transaction updates the entry associated with the referenced object in the invalidation map (112). In one embodiment, the update at step (112) takes place with a bit entry change in the invalidation map to set the state of the object to invalid. After the update at step (112), an acknowledgement communication is sent to the primary node. Accordingly, the synchronous process for object data update utilizes the invalidation map together with communication between the primary node and the secondary node(s).

The acknowledgement communication at step (112) indicates that the bit entry in the invalidation map of the secondary caching node was changed. The system may be configured with two or more server secondary caching nodes in communication with the primary node. To accommodate a system with two or more secondary nodes, following step (114), it is determined if the primary node received an acknowledgement communication from each of the secondary caching nodes (116). If the primary node did not receive an acknowledgement from each secondary caching node, then the primary node waits to receive any missing acknowledgement communications (118). After expiration of the waiting period (118), the process returns to step (116). Once the primary node has received acknowledgements from each of the secondary caching nodes in communication with the primary node, the write transaction is acknowledged back to a client program (120). In one embodiment, the write object is updated to back end storage following or concurrently with a write transaction to the distributed in-memory key-value cache. Accordingly, the process demonstrated in steps (108)-(114) is a synchronous update of data in response to a write transaction.

Data objects of the primary node that are replicated on one or more secondary caching node are synchronously updated in response to a write transaction. The asynchronous process is shown in steps (122)-(126). More specifically, following step (104), update data is sent from the primary node to each secondary caching node containing the written object (122). In response to receipt of the update data, the primary node receives an acknowledgement for each updated secondary caching node (124). For each updated secondary caching node the update data is asynchronously logged to local persistent storage (126), i.e. persistent storage local to the secondary caching node. In one embodiment, the update data is sent to persistent storage in batches such that more than one update occurs in a single communication. Following step (126), the invalidation map of each secondary node is cleared (122). In one embodiment, update bits of each invalidation map are cleared, validating the previously invalid bits. Accordingly, update data of each of the secondary nodes in communication with the primary node may be asynchronously updated.

Figure 2:
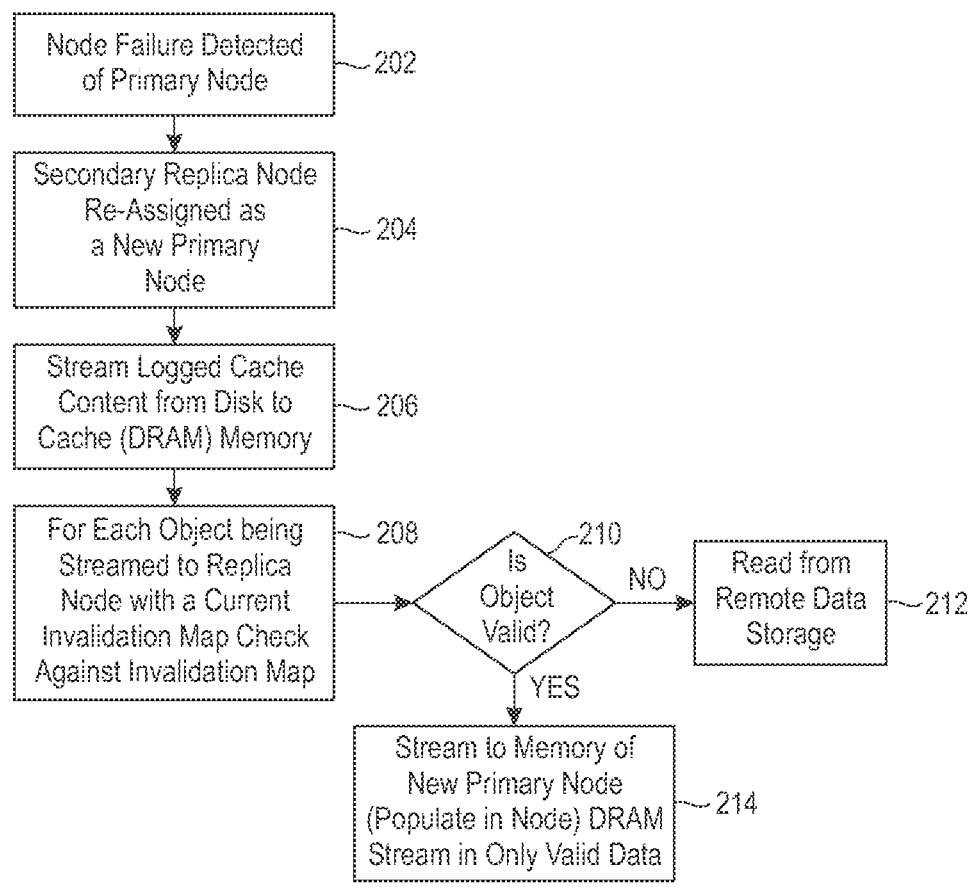
FIG. 2 depicts a flow chart illustrating a method for response to a primary node failure

FIG. 2 is a flow chart (200) illustrating a method for reassigning data in the event of failure of the primary node. Following detection of a node failure (202), a secondary replica node is re-assigned as a new primary node (204). In one embodiment, fewer replicas are maintained in the system due to the re-assignment of a replica node into a primary node. In another embodiment, a new replica node is created in response to the re-assignment of a replica node into a primary node for the purpose of maintaining a set number of replica nodes. Logged cache content is streamed from the local persistent storage of the new primary node to the cache memory (DRAM) of the new primary node (206). In one embodiment, the streaming is sequentially performed. For each streamed object (208), it is determined if the streamed object is valid (210). In one embodiment, the replacement primary node is a former secondary caching node, and has an invalidation map in local DRAM and the object validation at step (210) employs the local invalidation map. If it is determined that the object is not valid, then the object is read from remote data storage (210) e.g. remote persistent storage. Conversely, if the object is valid, than the object is streamed from the log of the local persistent memory to the memory (DRAM) of the new primary node (214). In one embodiment, the primary node does not contain an invalidation map, e.g. invalidation maps are contained within the secondary nodes. Accordingly, valid data is streamed to memory of a secondary replica node designated as a new primary node to replace a primary node in the event of a primary node failure, allowing a system to recover from a caching node failure at streaming disk speeds.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The functional unit(s) described in this specification has been labeled with tools in the form of manager(s). A manager may be implemented in programmable hardware devices such as field programmable gate arrays, programmable array logic, programmable logic devices, or the like. The manager(s) may also be implemented in software for processing by various types of processors. An identified manager of executable code may, for instance, comprise one or more physical or logical blocks of computer instructions which may, for instance, be organized as an object, procedure, function, or other construct. Nevertheless, the executable of an identified manager need not be physically located together, but may comprise disparate instructions stored in different locations which, when joined logically together, comprise the managers and achieve the stated purpose of the managers and directors.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Figure 3:
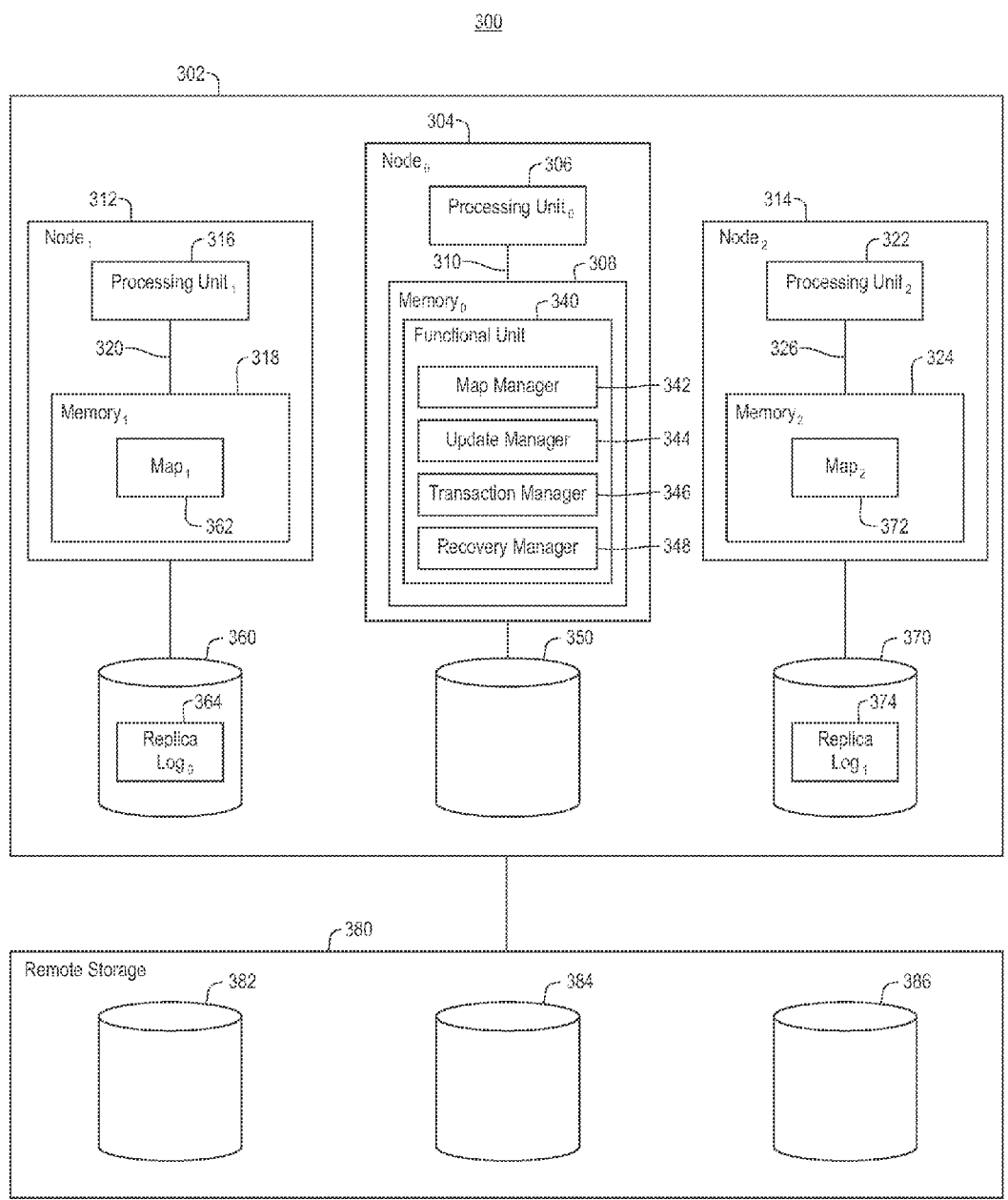
FIG. 3 depicts a block diagram illustrating tools embedded in a computer system to support high availability of objects in distributed in-memory caches.

FIG. 3 is a block diagram (300) illustrating tools embedded in a computer system to maintain high availability of objects in distributed in-memory caches backed by a database. A plurality of caching nodes (302) is shown in communication with remote data storage (380). While three data storage units are shown, the remote storage (380) may include any number of data storage units. In the example shown herein, there are three caching nodes (312), (304), and (314). However, the invention should not be limited to the quantity of caching nodes illustrated. In the illustration shown herein, node (304) is designated as the primary node and is shown having a processing unit (306) in communication with memory (308) across a bus (310). The primary node (304) is in communication with local persistent storage (350). Nodes (312) and (314) are in communication with the primary node (304) and are referred to herein as secondary caching nodes. Although two secondary caching nodes are shown, the invention is not limited to this quantity. Furthermore, a primary node or a secondary node may have dual functionality and may function as both a primary node, and a secondary node for a different primary node. The system requires a minimum of one secondary caching node. Accordingly, one primary node and one or more secondary caching nodes are provided in a system to maintain high availability of objects.

Each secondary node contains a processing unit in communication with memory across a bus. As shown, secondary caching node (312) is provided with a processing unit (316) in communication with memory (318) across a bus (320), and in communication with local persistent storage (360). Similarly, secondary caching node (314) is provided with a processing unit (322) in communication with memory (324) across a bus (326), and in communication with local persistent storage (370). Each local persistent storage device (360) and (370) is provided with a replica log (364) and (374), respectively. In addition, each secondary caching node (312) and (314) is provided with an invalidation map, (362) and (372) respectively, local to memory (318) and (324), respectively. The invalidation maps function to map valid and invalid data objects as replicated from the primary node (304). Accordingly, a system of nodes, invalidation maps, and replica logs are provided for the storage and management of cached objects.

A functional unit is provided with tools to maintain high performance availability of objects in distributed in-memory caches. The primary node (304) is shown with the functional unit (340) in communication with memory (308) having tools embodied therewith. The tools include but are not limited to: a map manager (342), an update manager (344), and in one embodiment, a transaction manager (346), and a recovery manager (348). The map manager (342) maintains the invalidation maps (362) and (372), respectively, each invalidation map local to one of the secondary caching nodes (312) and (314). The map manager (342) updates the invalidation map in response to the invalidation of the object in memory. The map manager further logs the update to local persistent storage of a secondary caching node, (312) and (314) respectively, and subsequently clears the in-memory invalidation map (362) and (372) of the secondary caching node (312) and (314), respectively. The transaction manager (346) is provided to serve read and write transactions at memory speeds during normal operations, and the recovery manager (348) is provided to recover from caching node failures at streaming disk I/O speeds.

The update manager (344), is in communication with the map manager (342). At least one secondary node contains a primary replica of the objects of the primary node (304) in memory. The update manager updates an in-memory copy of a primary replica in response to an update request. In one embodiment, the update manager (344) updates a disk local to one of the secondary caching nodes. In one embodiment, the update manager (344) sends the updates from the primary node (304) to one of the secondary nodes, (306) and (308) respectively, in batches; these batches in combination comprising the entire update. The update manager (344) synchronously invalidates an object of the update request in memory within one of the secondary caching nodes, and propagates the update to a replica disk local to the node. The update manager further streams logged cache content from disk to memory on a secondary caching node in response to a cache node failure of the primary node (304). Using the invalidation map local to a secondary node, the update manager (344) invalidates a stale object. Accordingly, the update manager, in combination with the map manager, manages valid and invalid objects within the secondary cache.

Figure 4:
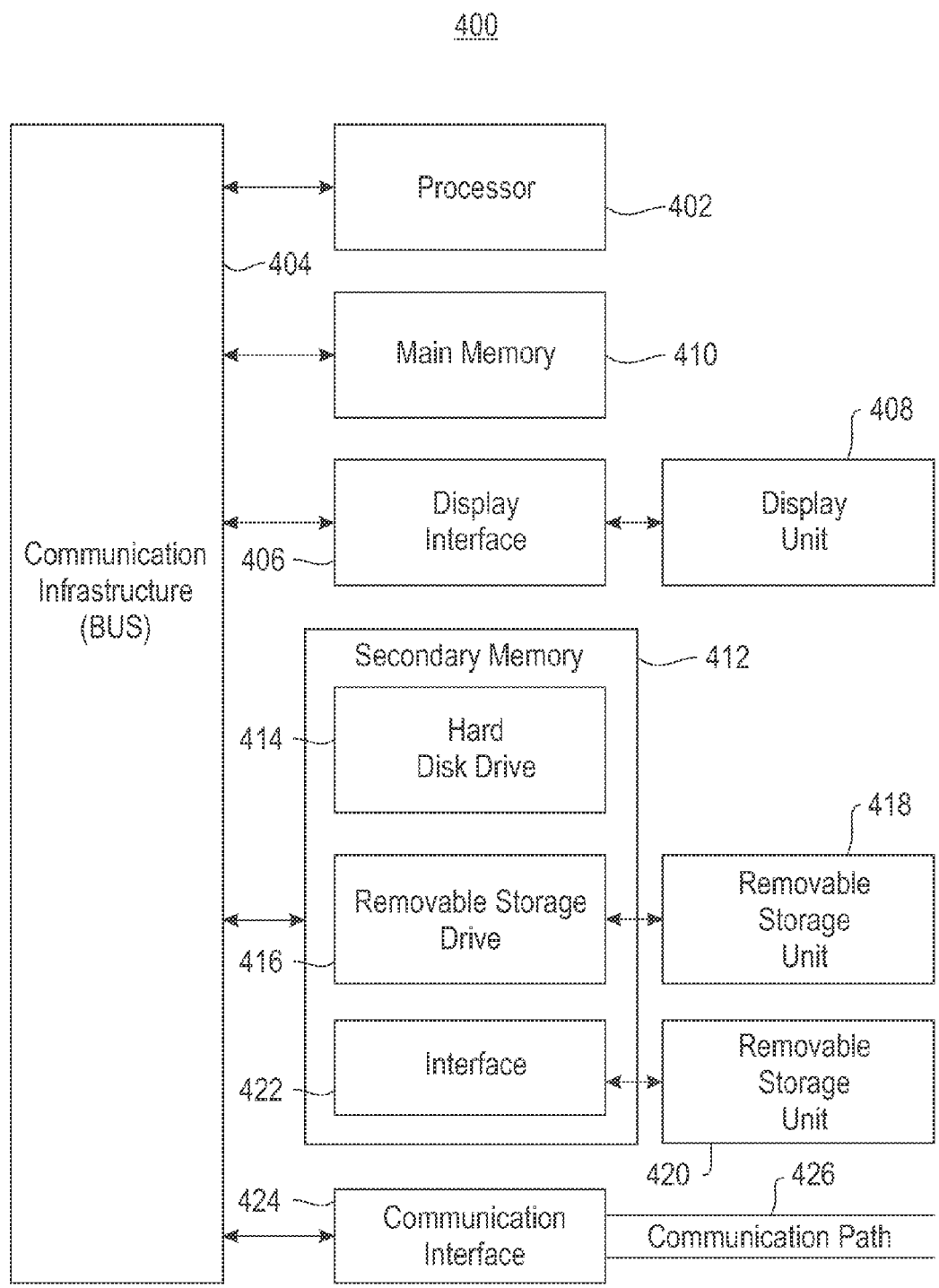
FIG. 4 depicts a block diagram showing a system for implementing an embodiment of the present invention.

Referring now to the block diagram (400) of FIG. 4, additional details are now described with respect to implementing an embodiment of the present invention. The computer system includes one or more processors, such as a processor (402). The processor (402) is connected to a communication infrastructure (404) (e.g., a communications bus, cross-over bar, or network).

The computer system can include a display interface (406) that forwards graphics, text, and other data from the communication infrastructure (404) (or from a frame buffer not shown) for display on a display unit (408). The computer system also includes a main memory (410), preferably random access memory (RAM), and may also include a secondary memory (412). The secondary memory (412) may include, for example, a hard disk drive (414) (or alternative persistent storage device) and/or a removable storage drive (416), representing, for example, a floppy disk drive, a magnetic tape drive, or an optical disk drive. The removable storage drive (416) reads from and/or writes to a removable storage unit (418) in a manner well known to those having ordinary skill in the art. Removable storage unit (418) represents, for example, a floppy disk, a compact disc, a magnetic tape, or an optical disk, etc., which is read by and written to by a removable storage drive (416). As will be appreciated, the removable storage unit (418) includes a computer readable medium having stored therein computer software and/or data.

In alternative embodiments, the secondary memory (412) may include other similar means for allowing computer programs or other instructions to be loaded into the computer system. Such means may include, for example, a removable storage unit (420) and an interface (422). Examples of such means may include a program package and package interface (such as that found in video game devices), a removable memory chip (such as an EPROM, or PROM) and associated socket, and other removable storage units (420) and interfaces (422) which allow software and data to be transferred from the removable storage unit (420) to the computer system.

The computer system may also include a communications interface (424). Communications interface (424) allows software and data to be transferred between the computer system and external devices. Examples of communications interface (424) may include a modem, a network interface (such as an Ethernet card), a communications port, or a PCMCIA slot and card, etc. Software and data transferred via communications interface (424) are in the form of signals which may be, for example, electronic, electromagnetic, optical, or other signals capable of being received by communications interface (424). These signals are provided to communications interface (424) via a communications path (i.e., channel) (426). This communications path (426) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (410) and secondary memory (412), removable storage drive (416), and a hard disk installed in hard disk drive or alternative persistent storage device (414).

Computer programs (also called computer control logic) are stored in main memory (410) and/or secondary memory (412). Computer programs may also be received via a communication interface (424). Such computer programs, when run, enable the computer system to perform the features of the present invention as discussed herein. In particular, the computer programs, when run, enable the processor (402) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to transaction processing, including, but not limited to, optimizing the storage system and processing transactions responsive to the optimized storage system.

ALTERNATIVE EMBODIMENT(S)

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method for use in a system comprising distributed in-memory caches backed by a database, including a primary node in communication with one or more replica nodes, the method comprising:
    in response to writing an object to cache memory of the primary node:
        maintaining a first replica of the object on persistent storage local to each replica node, including maintaining the first replica on first persistent storage local to a first replica node;
        maintaining a second replica of the object on remote persistent storage; and
        maintaining an in-memory invalidation map local to replica node;
    in response to receipt of an update request referencing the object, updating each first replica, wherein updating each first replica comprises:
        synchronously invalidating each first replica, including updating each invalidation map, wherein updating each invalidation map comprises changing an entry of each invalidation map to set a state of the first replica to invalid; and
        in response to the primary node receiving an invalidation acknowledgment from each replica node, asynchronously propagating the update to the persistent storage local to each replica node; and
    in response to a primary node failure, recovering from the primary node failure, including:
        reassigning the first replica node to replace the failed primary node; and
        streaming logged cache content from the first persistent storage, including determining the validity of an object of the logged cache content based on the invalidation map of the reassigned node, wherein the object is streamed to cache memory of the reassigned node in response to the object being valid, and wherein the object is read from the remote persistent storage in response to the object being invalid.

2. The method of claim 1, wherein asynchronously propagating the update includes sending the update request from the primary node to each replica node associated with the batch, logging the update to the persistent storage local to each replica node associated with the batch, and clearing the invalidation map of each replica node associated with the batch.

3. The method of claim 1, further comprising serving a read transaction and a write transaction at memory speed during normal operation.

4. The method of claim 1, wherein the primary node failure is recovered from at streaming disk I/O speed.

5. The method of claim 1, wherein the asynchronous propagation of the update comprises sending one or more batches of updates to the persistent storage local to each replica node, wherein each batch permits multiple updates to occur in a single propagation.

6. The method of claim 1, wherein recovering from the primary node failure further comprises replacing the reassigned first replica node with a new replica node.

7. A computer program product for use with electronic communication data in a system comprising distributed in-memory caches backed by a database, including a primary node in communication with one or more replica nodes, the computer program product comprising a computer-readable non-transitory storage medium having computer readable program code embodied thereon, the program code executable by a processor to:
- in response to writing an object to cache memory of the primary node:
  - maintain a first replica of the object on persistent storage local to each replica node, including program code to maintain the first replica on first persistent storage local to a first replica node;
  - maintain a second replica of the object on remote persistent storage; and
  - maintain an in-memory invalidation map local to each replica node;
- in response to receipt of an update request referencing the object, update each first replica, wherein the updating each first replica comprises program code to:
  - synchronously invalidate each first replica, including program code to update each invalidation map, wherein updating each invalidation map comprises program code to change an entry of the first invalidation map to set a state of the first replica to invalid; and
  - in response to the primary node receiving an invalidation acknowledgment from each replica node, asynchronously propagate one or more batches of updates to the persistent storage local to the replica nodes, wherein each batch updates at least a portion of the replica nodes, and wherein each batch permits multiple updates to occur in a single propagation; and
- in response to a primary node failure, recover from the primary node failure, including program code to:
  - reassign the first replica node to replace the failed primary node; and
  - stream logged cache content from the first persistent storage, including program code to determine the validity of an object of the logged cache content based on the invalidation map of the reassigned node, wherein the object is streamed to cache memory of the reassigned node in response to the object being valid, and wherein the object is read from the remote persistent storage in response to the object being invalid.

8. The computer program product of claim 7, wherein asynchronously propagating the update includes program code to send the update request from the primary node to each replica node associated with the batch, log the update to the persistent storage local to each replica node associated with the batch, and clear the invalidation map of each replica node associated with the batch.

9. The computer program product of claim 7, further comprising serving a read transaction and a write transaction at memory speed during normal operation.

10. The computer program product of claim 7, wherein the primary node failure is recovered from at streaming disk I/O speed.

11. The computer program product of claim 7, wherein the asynchronous propagation of the update comprises program code to send one or more batches of updates to the persistent storage local to each replica node, wherein each batch permits multiple updates to occur in a single propagation.

12. The computer program product of claim 7, wherein recovering from the primary node failure further comprises replacing the reassigned first replica node with a new replica node.

13. A system comprising:
- distributed in-memory caches backed by a database, including a primary node in communication with one or more replica nodes, wherein the primary node comprises a primary processing unit in communication with primary memory, and wherein each replica node comprises a secondary processing unit in communication with secondary memory;
- remote persistent storage in communication with each node;
- in response to writing an object to cache memory of the primary node:
  - the one or more replica nodes to maintain a first replica of the object on persistent storage local to each replica node, including a first replica node to maintain a first replica of the object on first persistent storage local to the first replica node;
  - the secondary memory to maintain an invalidation map; and
  - the remote persistent storage to maintain a second replica of the object; and
- a functional unit in communication with the primary memory, the functional unit to:
  - in response to receipt of an update request referencing the object, update each first replica, wherein updating each first replica comprises the functional unit to:
    - synchronously invalidate each first replica, including the functional unit to update each invalidation map, wherein updating each invalidation map comprises the functional unit to change an entry of each invalidation map to set a state of the first replica to invalid; and
    - in response to the primary node receiving an invalidation acknowledgment from each replica node, asynchronously propagate one or more batches of updates to the persistent storage local to the replica nodes, wherein each batch updates at least a portion of the replica nodes, and wherein each batch permits multiple updates to occur in a single propagation; and
  - in response to a primary node failure, recover from the primary node failure, including the function unit to:
    - reassign the first replica node to replace the failed primary node; and
    - stream logged cache content from the first persistent storage, including the functional unit to determine the validity of an object of the logged cache content based on the invalidation map of the reassigned node, wherein the object is streamed to cache memory of the reassigned node in response to the object being valid, and wherein the object is read from the remote persistent storage in response to the object being invalid.

14. The system of claim 13, wherein the asynchronous propagation of the update comprises the functional unit to send the update request from the primary node to each replica node associated with the batch, log the update to the persistent storage local to each replica node associated with the batch, and clear the invalidation map of each replica node associated with the batch.

15. The system of claim 13, further comprising the functional unit to serve read and write transactions at memory speeds during normal operation, and wherein the primary node failure is recovered from at streaming disk I/O speed.

16. The system of claim 13, wherein the asynchronous propagation of the update comprises the functional unit to send one or more batches of updates to the persistent storage local to each replica node, wherein each batch permits multiple updates to occur in a single propagation.

17. The system of claim 13, wherein recovering from the primary node failure further comprises replacing the reassigned first replica node with a new replica node.

\* \* \* \* \*